United States Patent Office 2,695,882
Patented Nov. 30, 1954

2,695,882
PROCESS FOR BREAKING PETROLEUM EMULSIONS

Melvin De Groote, University City, Mo., assignor to Petrolite Corporation, a corporation of Delaware No Drawing. Application January 21, 1952, Serial No. 267,513

11 Claims. (Cl. 252—340)

This invention relates to processes or procedures particularly adapted for preventing, breaking or resolving emulsions of the water-in-oil type, and particularly petroleum emulsions.

Complementary to the above aspect of my invention is my companion invention concerned with the new chemical products or compounds used as the demulsifying agents in said aforementioned processes or procedures, as well as the application of such chemical compounds, products and the like, in various other arts and industries, along with the method for manufacturing said new chemical products or compounds which are of outstanding value in demulsification. See my co-pending application, Serial No. 267,514, filed January 21, 1952.

My invention provides an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

The demulsifying agents employed in the present process are fractional esters obtained from a polycarboxy acid or the equivalent and oxypropylation derivatives in turn derived from the oxypropylation of glycols having the general formula

R'—CHOH—CHOH—R'' wherein R' represents an alkyl radical containing at least 5 and not more than 18 carbon atoms in its chain, and R'' represents an alkyl radical containing not more than 18 carbon atoms. Such glycol of the kind described is treated with propylene oxide so that the molecular weight based on the hydroxyl value is within the range of 1000 to approximately 7000. Such oxypropylated derivatives are invariably xylene-soluble and water-insoluble. When the molecular weight, based on the hydroxyl value, is in the neighborhood of 1000 or thereabouts, the oxypropylated product is almost invariably kerosene-soluble. In fact, depending on the particular glycol subjected to oxypropylation the product may become kerosene-soluble at a lower range, for instance, at a range as low as 700 or 800 molecular weight. Such products can be obtained wherein one of the alkyl radicals has more than 5 carbon atoms provided the other radical has at least 5 or more and with the final proviso that the diol be water-insoluble.

These glycols which are subjected to oxypropylation prior to esterification may be obtained by well-known methods, for example, by the sodium reduction of the esters of the higher fatty acids followed by hydrogenation of the resulting acyloins to glycols. See U. S. Patent No. 2,079,403, dated May 4, 1937, to Hansley.

My preference, as noted elsewhere, is to have both alkyl radicals the same and having 7 to 18 carbon atoms. However, as previously pointed out the radicals may have 7 to 18 carbon atoms and not necessarily be the same radical, for instance, one could have 7 carbon atoms and the other 18 carbon atoms. Typical examples where R and R'' are the same are the following:

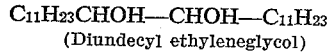
(Diundecyl ethyleneglycol)

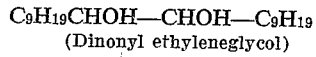
(Dinonyl ethyleneglycol)

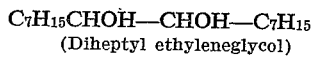
(Diheptyl ethyleneglycol)

More specifically, the glycols which I prefer to use are those having the general formula

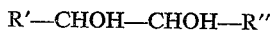

wherein R' and R'' represent the same saturated unsubstituted alkyl groups having straight chains containing from 7 to 18 carbon atoms.

For convenience, then, the oxypropylated derivative of the glycol may be indicated thus:

R'—CHO($C_3H_6O$)$_n$H—CHO($C_3H_6O$)$_{n'}$H—R'' with the proviso that $n$ and $n'$ represent whole numbers which, when added together, equal a sum varying from 15 to 80 and the acidic ester obtained by reaction with the polycarboxy acid may be indicated thus:

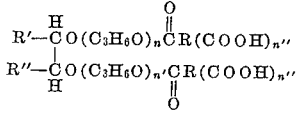

in which the characters have their previous significance, and $n''$ is a whole number not over 2, and R is the radical of the polycarboxy acid

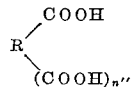

and preferably free from any radicals having more than 8 uninterrupted carbon atoms in a single group, and with the further proviso that the parent diol, prior to esterification, be preferably xylene-soluble, and better still, kerosene-soluble. The diols herein employed as raw materials are water-insoluble.

Attention is directed to U. S. Patent No. 2,562,878, dated August 7, 1951, in which there is described, among other things, a process for breaking petroleum emulsions of the water-in-oil type characterized by subjecting the emulsion to the action of an esterification product of a dicarboxylic acid and a polyalkylene glycol, in which the ratio of equivalents of polybasic acid to equivalents of polyalkylene glycol is in the range of 0.5 to 2.0, in which the alkylene group has from 2 to 3 carbon atoms, and in which the molecular weight of the product is between 1,500 to 4,000.

In the instant case the initial starting materials, i. e., glycols having the general formula

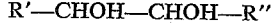

in which R' and R'' have their prior significance, are water-insoluble. Numerous water-insoluble compounds susceptible to oxyalkylation, and particularly, to oxyethylation, have been oxyethylated so as to produce effective surface-active agents, which, in some instances at least, also have had at least modest demulsifying property. Reference is made to similar monomeric compounds having a hydrophobe group containing, for example, 8 to 32 carbon atoms and a reactive hydrogen atom, such as the usual acids, alcohols, alkylated phenols, amines, amides, etc. In such instances, invariably the approach was to introduce a counter-balancing effect by means of the addition of a hydrophile group, particularly ethylene oxide, or, in some instances, glycide, or perhaps a mixture of both hydrophile groups and hydrophobe groups, as, for example, in the introduction of propylene oxide along with ethylene oxide. On another type of material a polymeric material, such as resin, has been subjected to reaction with alkylene oxides including propylene oxide. In such instances certain derivatives obtained from polycarboxy acids have been employed.

Obviously, thousands and thousands of combinations, starting with hundreds of initial water-insoluble materials, are possible. Exploration of a large number of raw materials has yielded only a few which appear to be commercially practical and competitive with available demulsifying agents.

Glycols having the general formula,

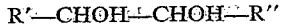

in which R' and R" have their previous significance, happens to be one case of a suitable compound. On the other hand, somewhat closely related compounds, for instance, alkyl esters of dihydroxylated compounds such as dihydroxystearic acid, do not seem to yield analogous derivatives of nearly the effectiveness of the herein described glycols. This is true also of a large number of other dihyroxylated compounds which are essentially water-insoluble and which have a total of 8 to 32 carbon atoms in the compound. The reason or reasons for this difference is merely a matter of speculation. These glycols are comparatively expensive and, obviously if cheaper dihydroxylated compounds of approximately the same general characteristics would serve nothing would be gained by the employment of a more expensive raw material.

Exhaustive oxypropylation renders a water-soluble material water-insoluble. Similarly, it renders a kerosene-insoluble material kerosene-soluble; for instance, reference has been made to the fact that this is true, for example, using polypropyleneglycol 2,000. Actually, it is true with polypropyleneglycol having lower molecular weights than 2,000. These materials are obtained by the oxypropylation of a water-soluble kerosene-insoluble material, i. e., either water or propyleneglycol.

Just why certain different materials which are water-insoluble to start with, and which, presumably are rendered more water-insoluble by exhaustive oxypropylation (if such expression as "more water-insoluble" has significance) can be converted into a valuable surface-active agent, and particularly a valuable demulsifying agent, by reaction with a polycarboxy acid which does not particularly affect the solubility one way or the other—depending upon the selection of the acid—is unexplainable.

The new products herein described are useful for a number of purposes other than resolution of petroleum emulsions. See my co-pending application, Serial No. 267,514, filed January 21, 1952.

For convenience, what is said hereinafter will be divided into four parts:

Part 1 will be concerned with the oxypropylated derivatives i. e., diols of the previously described glycols;

Part 2 will be concerned with the preparation of esters from the aforementioned diols or dihydroxylated compounds;

Part 3 will be concerned with the nature of the products obtained by oxypropylation in light of the fact that certain side reactions invariably and inevitably occur; and Part 4 will be concerned with the use of the esters obtained as described in Part 2 for the resolution of petroleum emulsions of the water-in-oil type.

PART 1

For a number of well known reasons equipment, whether laboratory size, semi-pilot plant size, pilot plant size, or large scale size, is not as a rule designed for a particular alkylene oxide. Invariably and inevitably, however, or particularly in the case of laboratory equipment and pilot plant size equipment the design is such as to use any of the customarily available alkylene oxides, i. e., ethylene oxide, propylene oxide, butylene oxide, glycide, epichlorohydrin, styrene oxide, etc. In the subsequent description of the equipment it becomes obvious that it is adapted for oxyethylation as well as oxypropylation.

Oxypropylations are conducted under a wide variety of conditions, not only in regard to presence or absence of catalyst, and the kind of catalyst, but also in regard to the time of reaction, temperature of reaction, speed of reaction, pressure during reaction; etc. For instance, oxyalkylations can be conducted at temperatures up to approximately 200° C., with pressures in about the same range up to about 200 pounds per square inch. They can be conducted, also, at temperatures approximating the boiling point of water or slightly above, as, for example, 95° to 120° C. Under such circumstances the pressure will be less than 30 pounds per square inch unless some special procedure is employed as is sometimes the case, to wit, keeping an atmosphere of inert gas such as nitrogen in the vessel during the reaction. Such low-temperature-low-reaction rate oxypropylations have been described very completely in U. S. Patent No. 2,448,664 to H. R. Fife et al., dated September 7, 1948. Low-temperature-low-pressure oxypropylations are particularly desirable where the compound being subjected to oxypropylation contain one, two, or three points of reaction only, such as monohydric alcohols, glycols and triols.

Since low - pressure - low - temperature - low - reaction speed oxypropylations require considerable time, for instance, 1 to 7 days of 24 hours each to complete the reaction, they are conducted as a rule, whether on a laboratory scale, pilot plant scale, or large scale, so as to operate automatically. The prior figure of seven days applies especially to large-scale operations involving excessive oxypropylation. I have used conventional equipment with two added automatic features:

(a) A solenoid-controlled valve which shuts off the propylene oxide in event that the temperature gets outside a predetermined and set range, for instance 95° to 120° C., or 130° to 135° C.; and (b) Another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose where the pressure of reaction is higher, speed of reaction is higher, and time of reaction is much shorter. In such instances such automatic controls are not necessarily used.

Thus, in preparing the various examples I have found it particularly advantageous to use laboratory equipment or pilot plant equipment which is designed to permit continuous oxyalkylation, whether it be oxypropylation or oxyethylation. With certain obvious changes the equipment can be used also to permit oxyalkylation involving the use of glycide where no pressure is involved, except the vapor pressure of a solvent, if any, which may have been used as a diluent.

As previously pointed out, the method of using propylene oxide is the same as ethylene oxide. This point is emphasized only for the reason that the apparatus is so designed and constructed as to use either oxide.

The oxypropylation procedure employed in the preparation of the oxyalkylated derivatives has been uniformly the same, particularly in light of the fact that a continuous automatically-controlled procedure was employed. In this procedure the autoclave was a conventional autoclave made of stainless steel and having a capacity of approximately 15 gallons and a working pressure of one thousand pounds gauge pressure. This pressure obviously is far beyond any requirement as far as propylene oxide goes, unless there is a reaction of explosive violence involved due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet; pressure gauge; manual vent line; charge hole for initial reactants; at least one connection for introducing the alkylene oxide, such as propylene oxide or ethylene oxide, to the bottom of the autoclave; along with suitable devices for both cooling and heating the autoclave, such as a cooling jacket, and preferably coils in addition thereto with the jacket so arranged that it is suitable for heating with steam or cooling with water and further equipped with electrical heating devices. Such autoclaves are, of course, in essence small-scale replicas of the usual conventional autoclave used in oxyalkylation procedures. In some instances in exploratory preparations an autoclave having a smaller capacity, for instance, approximately 3½ liters in one case, and about 1¾ gallons in another case, was used.

Continuous operation, or substantially continuous operation, was achieved by the use of a separate container to hold the alkylene oxide being employed, particularly propylene oxide. In conjunction with the smaller autoclaves the container consists essentially of a laboratory bomb having a capacity of about one-half gallon, or somewhat in excess thereof. In some instances a larger bomb was used, to wit, one having a capacity of about one gallon. This bomb was equipped, also, with an inlet for charging, and an eductor tube going to the bottom of the container so as to permit discharging of alkylene oxide in the liquid phase to the autoclave. A bomb having a capacity of about 60 pounds was used in connection with the 15-gallon autoclave. Other conventional equipment consists, of course, of the rupture disc, pressure gauge, sight feed glass, thermometer connection for nitrogen for pressuring bomb, etc. The bomb was placed on a scale during use. The connections between the bomb and the autoclave were flexible stainless steel hose or tubing so that continuous weighings could be made without breaking or making any connections. This applies also to the nitrogen line, which was used to pressure the bomb reservoir. To the extent that it was required any other usual conventional procedure or addition which provided greater safety was used, of course, such as safety glass, protective screens, etc.

Attention is directed again to what has been said previously in regard to automatic controls, which shut off the propylene oxide in event temperature of reaction passes out of the predetermined range, or if pressure in the autoclave passes out of predetermined range.

With this particular arrangement practically all oxypropylations become uniform in that the reaction temperature was held within a few degrees of any selected point, for instance, if 130° C. was selected as the operating temperature the maximum point would be at the most 135° C. or 138° C. and the lower point would be 125° C. or possibly 128° C. Similarly, the pressure was held at approximately 30 pounds or less within a 5-pound variation one way or the other, but might drop to practically zero, especially where no solvent such as xylene is employed. The speed of reaction was comparatively slow under such conditions as compared with oxyalkylations at 200° C. Numerous oxypropylations have been conducted in which the time varied from one day (24 hours) up to three days (72 hours), for completion of the final member of a series. In some instances the reaction involving the instant reactants may take place in considerably less time, i. e., 24 hours or less, as far as a partial oxypropylation is concerned. The minimum time recorded was about a 1½ hour period in a single step. Reactions indicated as being complete in 8½ hours may have been complete in a lesser period of time in light of the automatic equipment employed. This applies also where the reactions were complete in a shorter period of time, for instance, 2 to 5 hours. In the addition of propylene oxide in the autoclave equipment as far as possible the valves were set so all the propylene oxide if fed continuously, would be added at a rate so that the predetermined amount would react within the 5½ hours of an 8-hour period, or two-thirds of any shorter period. This meant that if the reaction was interrupted automatically for a period of time for pressure to drop or temperature to drop, the predetermined amount of oxide would still be added in most instances well within the predetermined time period. Sometimes where the addition was a comparatively small amount in a 5-hour period there would be an unquestionable speeding up of the reaction by simply repeating the examples and using 1½, 2, or 3 hours instead of 5 hours.

When operating at a comparatively high temperature, for instance, between 150° and 200° C., an unreacted alkylene oxide such as propylene oxide makes its presence felt in the increase in pressure, or the consistency of a higher pressure. However, at a low enough temperature it may happen that the propylene oxide goes in as a liquid. If so, and if it remains unreacted, there is, of course, an inherent danger and appropriate steps must be taken to safeguard against this possibility; if need be, a sample must be withdrawn and examined for unreacted propylene oxide. One obvious procedure, of course, is to oxypropylate at a modestly higher temperature, for instance, at 140° to 150° C. Unreacted oxide affects determination of the acetyl or hydroxyl value of the hydroxylated compound obtained.

The higher the molecular weight of the compound, i. e., towards the latter stages of reaction, the longer the time required to add a given amount of oxide. One possible explanation is that the molecule, being larger, the opportunity for random reaction is decreased. Inversely, the lower the molecular weight the faster the reaction takes place. For this reason, sometimes at least, increasing the concentration of the catalyst does not appreciably speed up the reaction, particularly when the product subjected to oxyalkylation has a comparatively high molecular weight. However, as has been pointed out previously, operating at a low pressure and a low temperature, even in large scale operations as much as a week or ten days' time may lapse to obtain some of the higher molecular weight derivatives from monohydric or dihydric materials. Side reactions are almost invariably a problem. See U. S. Patent No. 2,236,919, dated April 1, 1941.

In a number of operations the counterbalance scale or dial scale holding the propylene oxide bomb was so set that when the predetermined amount of propylene oxide had passed into the reaction, the scale movement through a time-operating device was set for either one to two hours so that reaction continued for one to three hours after the final addition of the last propylene oxide, and thereafter the operation was shut down. This particular device is particularly suitable for use on larger equipment than laboratory size autoclaves, to wit, on semi-pilot plant or pilot plant size equipment, as well as on large scale size equipment. This final stirring period is intended to avoid the presence of unreacted oxide.

In this sort of operation, of course, the temperature range was controlled automatically by either use of cooling water, steam, or electrical heat, so as to raise or lower the temperature. The pressuring of the propylene oxide into the reaction vessel also was automatic insofar that the feed stream was set for a slow, continuous run which was shut off in case the pressure passed a predetermined point, as previously set out. All the points of design, construction, etc., were conventional including the gases, check valves and entire equipment. As far as I am aware at least two firms, and possibly three, specialize in autoclave equipment such as I have employed in the laboratory and are prepared to furnish equipment of this same kind. Similarly, pilot plant equipment is available. This point is simply made as a precaution in the direction of safety. Oxyalkylations, particularly involving ethylene oxide, glycide, propylene oxide, etc., should not be conducted except in equipment specifically designed for the purpose.

*Example 1a*

The starting material was diundecyl ethyleneglycol. The particular autoclave employed was one having a capacity of about 15 gallons or on the average of 125 pounds of reaction mass. The speed of the stirrer could be varied from about 150 to 350 R. P. M. 20 pounds of diundecyl ethyleneglycol were charged into the autoclave along with 2 pounds of finely pulverized caustic soda. No solvent was added in this particular run although on smaller runs small amounts of xylene have been added; for instance, about one-half as much xylene as substituted glycol. Needless to say, one could not only add xylene but, for that matter, any conventional solvent. Even if the glycol is not completely soluble in the selected solvent, it still produces a slurry that is sometimes more convenient to handle.

The reaction pot was flushed out with nitrogen, the autoclave was sealed and the automatic devices set for injecting 50 pounds of propylene oxide in about 2 hours. At the end of this time the stirring was continued for another half hour. The pressuring device was set for a maximum of 30 pounds per square inch, or slightly in excess thereof, perhaps as high as 33 pounds. Actually in the course of the reactions due to the presence of a generous amount of catalyst the reaction pressure never got over 15 to 20 pounds either at this particular stage or in any of the subsequent examples, 2a through 6a, inclusive. For this reason no further reference will be made to operating pressures in subsequent stages. Needless to say, when one sets the gauge for a maximum pressure the bulk of the reaction can take place, and probably does take place, at a lower pressure. The low pressure is the result, as a rule of (a) Activity of the reactant,
(b) Presence of a sizable amount of catalyst,
(c) Efficient agitation, and,
(d) A fairly long time of reaction.

The propylene oxide was added comparatively slowly and, more important, the selected temperature, although moderately higher than the boiling point of water, was not excessively high; for instance, in this particular stage, and in fact in all subsequent stages, reaction took place within the range of 130° to 135° C. For this reason no further reference will be made in Examples 2a through 6a to temperature of reaction.

At the completion of the reaction a sample was taken and oxypropylation proceeded as in Example 2a, following:

Example 2a 64 pounds of the reaction mass, identified as Example 1a, preceding, and equivalent to 17.8 pounds of the original glycol, 44.42 pounds of propylene oxide, and 1.78 pounds of caustic soda were permitted to remain in the reaction vessel. Without the addition of any more catalyst, 25 pounds of propylene oxide were added. The oxypropylation was conducted in the same manner as outlined in Example 1a, preceding, particularly with regard to temperature and pressure. The reaction time was slightly shorter, notwithstanding a lower concentration of catalyst. This was probably due to the fact that less oxide was added. The time required was two hours. At the end of the reaction period part of the reaction mass was withdrawn as a sample and oxypropylation continued with the remainder of the reaction mass as described in Example 3a following.

Example 3a 79 pounds of the reaction mass identified as Example 2a, preceding, and equivalent to 15.80 pounds of the original glycol, 61.62 pounds of propylene oxide and 1.58 pounds of caustic soda were permitted to remain in the reaction vessel. 30 pounds of propylene oxde were introduced in this third stage. The reaction time was 3 hours. The conditions as far as temperature and pressure were concerned were the same as in the previous two examples. After the completion of the reaction, part of the reaction mass was withdrawn and the remainder subjected to further oxypropylation as described in Example 4a, following.

Example 4a 89 pounds of the reaction mass identified as Example 3a, preceding, and equivalent to 12.90 pounds of the initial glycol, 71.84 pounds of propylene oxide, and 1.29 pounds of caustic soda, were permitted to remain in the autoclave. Without adding any more catalyst this reaction mass was subjected to further oxypropylation in the same manner as in the preceding example. 20 pounds of propylene oxide were added in a 4½ hour period. Conditions as far as temperature and pressure were concerned were the same as in preceding examples. At the completion of the reaction part of the reaction mass was withdrawn as a sample and oxypropylation conducted further as described in Example 5a, following.

Example 5a 79 pounds of the reaction mass identified as Example 4a, preceding, and equivalent to 9.37 pounds of the initial glycol, 68.7 pounds of propylene oxide, and .93 pound of caustic soda were permitted to remain in the autoclave. Without adding any more catalyst this reaction mass was subjected to further oxypropylation in the same manner as in the preceding examples. Conditions as far as temperature and pressure were concerned were the same as before. The time required to add the oxide was 6 hours, due in part to the lower concentration of catalyst. At the completion of the reaction part of the reaction mass was withdrawn as a sample and the remainder subjected to further oxypropylation as described in Example 6a, immediately following.

Example 6a 60 pounds of the reaction mass identified as Example 5a, preceding, and equivalent to 5.4 pounds of the initial glycol, 54.06 pounds of propylene oxide, and .54 pound of caustic soda were reacted with 20 pounds of propylene oxide. No additional catalyst was added. The reaction, as far as temperature and pressure were concerned, was the same as in the preceding examples. The time required to add the oxide was comparatively long, to wit; 8½ hours.

In this particular series of examples the oxypropylation was stopped at this stage. In other series I have continued the oxypropylation so that the theoretical molecular weight was approximately 8,000 to 9,200, and the hydroxyl molecular weights were approximately 3,750, or thereabouts. Other weights, of course, are obtainable, using the same procedure.

What is said herein is presented in tabular form in Table 1, immediately following, with some added information as to molecular weight and as to solubility of the reaction product in water, xylene, and kerosene.

*Table 1*

| Ex. No. | Composition before | | | Composition at end | | | | | Max. temp., °C. | Max. pres., lbs. sq. in. | Time, hrs. |
|---|---|---|---|---|---|---|---|---|---|---|---|
| | High molal glycol, lbs. | Oxide amt., lbs. | Catalyst, lbs. | Theo. M. W. | High molal glycol, lbs. | Oxide amt., lbs. | Catalyst, lbs. | Hyd. mol. wt. | | | |
| 1a | 20 | | 2.0 | 1,295 | 20.0 | 50.0 | 2.0 | 950 | 130-135 | 15-20 | 2½ |
| 2a | 17.8 | 44.42 | 1.78 | 1,820 | 17.8 | 69.42 | 1.78 | 1,340 | 130-135 | 15-20 | 2 |
| 3a | 15.8 | 61.62 | 1.58 | 2,515 | 15.8 | 91.62 | 1.58 | 1,810 | 130-135 | 15-20 | 3 |
| 4a | 12.9 | 74.81 | 1.29 | 3,090 | 12.9 | 94.81 | 1.29 | 2,050 | 130-135 | 15-20 | 4½ |
| 5a | 9.37 | 68.7 | .93 | 4,070 | 9.37 | 93.7 | .93 | 2,289 | 130-135 | 15-20 | 6 |
| 6a | 5.40 | 54.06 | .54 | 5,440 | 5.40 | 74.06 | .54 | 3,010 | 130-135 | 15-20 | 8½ |
| 7a | 24.0 | | 2.5 | 890 | 24.0 | 50.0 | 2.5 | 750 | 130-135 | 15-20 | 1½ |
| 8a | 21.7 | 44.6 | 2.2 | 1,285 | 21.7 | 74.6 | 2.2 | 1,010 | 130-135 | 15-20 | 2 |
| 9a | 14.95 | 51.55 | 1.5 | 1,970 | 14.95 | 86.55 | 1.5 | 1,560 | 130-135 | 15-20 | 2 |
| 10a | 9.15 | 52.9 | .95 | 2,920 | 9.15 | 82.9 | .95 | 1,885 | 130-135 | 15-20 | 3 |
| 11a | 5.90 | 53.5 | .60 | 4,630 | 5.90 | 88.5 | .60 | 2,358 | 130-135 | 15-20 | 4¾ |
| 12a | 4.34 | 65.22 | .44 | 6,310 | 4.34 | 90.22 | .44 | 3,097 | 130-135 | 15-20 | 7 |
| 13a | 25.0 | | 2.5 | 825 | 25.0 | 55.0 | 2.5 | 795 | 130-135 | 15-20 | 2 |
| 14a | 18.8 | 41.32 | 1.88 | 1,370 | 18.8 | 81.32 | 1.88 | 1,012 | 130-135 | 15-20 | 3 |
| 15a | 12.3 | 53.47 | 1.23 | 2,140 | 12.3 | 93.47 | 1.23 | 1,538 | 130-135 | 15-20 | 3 |
| 16a | 6.90 | 52.41 | .69 | 3,210 | 6.90 | 82.41 | .69 | 1,975 | 130-135 | 15-20 | 4½ |
| 17a | 4.60 | 54.94 | .46 | 5,025 | 4.60 | 84.94 | .46 | 2,960 | 130-135 | 15-20 | 5 |
| 18a | 25.0 | | 2.5 | 1,400 | 25.0 | 40.0 | 2.5 | 930 | 130-135 | 15-20 | 4 |
| 19a | 22.2 | 35.6 | 2.2 | 2,130 | 22.2 | 65.6 | 2.2 | 1,412 | 130-135 | 15-20 | 3 |
| 20a | 14.8 | 43.72 | 1.48 | 3,270 | 14.8 | 73.72 | 1.48 | 2,035 | 130-135 | 15-20 | 5 |
| 21a | 9.87 | 49.15 | .98 | 4,855 | 9.87 | 79.15 | .98 | 2,784 | 130-135 | 15-20 | 5 |
| 22a | 6.57 | 52.77 | .66 | 7,550 | 6.57 | 85.77 | .66 | 3,156 | 130-135 | 15-20 | 7 |

Examples 1a through 6a were prepared from diundecylethyleneglycol.
Examples 7a through 12a were prepared from dinonylethyleneglycol.
Examples 13a through 17a were prepared from diheptylethyleneglycol.
Examples 18a through 22a were prepared from diheptadecylethyleneglycol.

As far as solubility is concerned, all the products were water-insoluble at all stages, but were xylene-soluble; and in the higher stages of oxypropylation, for instance at a hydroxyl molecular weight of 2,000 or more, they were kerosene-soluble.

Ordinarily in the initial oxypropylation of a simple compound, such as ethylene glycol or propylene glycol, the hydroxyl molecular weight is apt to approximate the theoretical molecular weight, based on completeness of reaction, if oxypropylation is conducted slowly and at a comparatively low temperature, as described. In this instance, however, this does not seem to follow, as it is noted in the preceding table that at the point were the theoretical molecular weight is approximately 2,000, the hydroxyl molecular weight is only about one-half this amount. This generalization does not necessarily apply where there are more hydroxyls present, and in the present instance the results are somewhat peculiar when compared with simple dihydroxylated materials as described, or with phenols.

The fact that such pronounced variation takes place between hydroxyl molecular weight and theoretical molecular weight, based on completeness of reaction, has been subjected to examination and speculation, but no satisfactory rationale has been suggested.

One suggestion has been that one hydroxyl is lost by dehydration and that this ultimately causes a break in the molecule in such a way that two new hydroxyls are formed. This is shown after a fashion in a highly idealized manner in the following way:

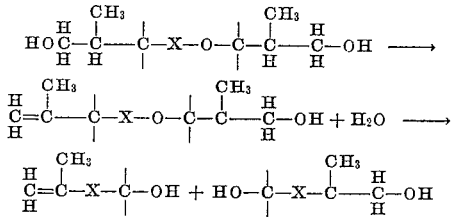

In the above formulas the large X obviously is not intended to signify anything except the central part of a large molecule, whereas, as far as a speculative explanation is concerned, one need only consider the terminal radicals as shown. Such suggestion is of interest only because it may be a possible explanation of how an increase in hydroxyl value does take place which could be interpreted as a decrease in molecular weight. This matter is considered subsequently in Part 3. Formation of cyclic alkylene oxide polymers, if not reactive towards polycarboxy acids, presumably would have the effect of decreasing the apparent hydroxyl value.

The final products at the end of the oxypropylation step were somewhat viscous liquids, about as viscous as ordinary polypropylene glycols, with a dark amber tint. This color, of course, could be removed if desired by means of bleaching clays, filtering chars, or the like. The products were slightly alkaline due to the residual caustic soda. The residual basicity due to the catalyst would be the same if sodium methylate had been employed.

Needless to say, there is no complete conversion of propylene oxide into the desired hydroxylated compounds. This is indicated by the fact that the theoretical molecular weight, based on a statistical average, is greater than the molecular weight calculated by usual methods on basis of acetyl or hydroxyl value. This is true even in the case of a normal run of the kind noted previously. It is true also in regard to the oxypropylation of simple compounds, for instance, propylene glycol or ethylene glycol.

Actually, there is no completely satisfactory method for determining molecular weights of these types of compounds with a high degree of accuracy when the molecular weights exceed 2,000. In some instances the acetyl value or hydroxyl value serves as satisfactorily as an index to the molecular weight as any other procedure, subject to the above limitations, and especially in the higher molecular weight range. If any difficulty is encountered in the manufacture of the esters, as described in Part 2, the stoichiometrical amount of acid or acid compound should be taken which corresponds to the indicated acetyl or hydroxyl value. This matter has been discussed in the literature and is a matter of common knowledge and requires no further elaboration. In fact, it is illustrated by some of the examples appearing in the patent previously mentioned.

PART 2

As previously pointed out, the present invention is concerned with acidic esters obtained from the oxypropylated derivatives described in Part 1, preceding, and polycarboxy acids, particularly tricarboxy acids like citric, and dicarboxy acids such as adipic acid, phthalic acid, or anhydride, succinic acid, diglycollic acid, sebacic acid, azelaic acid, aconitic acid, maleic acid, or anhydride, citraconic acid or anhydride, maleic acid or anhydride adducts, as obtained by the Diels-Alter reaction from products such as maleic anhydride, and cyclopentadiene. Such acids should be heat-stable so they are not decomposed during esterification. They may contain as many as 36 carbon atoms as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and glycols, or other hydroxylated compounds, is well known. Needless to say, various compounds may be used such as the low molal ester, the anhydride, the acyl chloride, etc. However, for purpose of economy it is customary to use either the acid or the anhydride. A conventional procedure is employed. On a laboratory scale one can employ a resin pot of the kind described in U. S. Patent No. 2,499,370, dated March 7, 1950, to De Groote and Keiser, and particularly with one more opening to permit the use of a porous spreader if hydrochloric acid gas is used as a catalyst. Such device or absorption spreader consists of minute alundum thimbles which are connected to a gas tube. One can add a sulfonic acid such as paratoluene sulfonic acid as a catalyst. There is some objection to this because in some instances there is some evidence that this acid catalyst tends to decompose or rearrange heat-oxypropylated compounds. It is particularly likely to do so if the esterification temperature is too high. In the case of polycarboxy acids such as diglycollic acid which is strongly acidic there is no need to add any catalyst. The use of hydrochloric acid gas has one advantage over paratoluene sulfonic acid and that is that at the end of the reaction it can be removed by flushing out with nitrogen, whereas there is no reasonably convenient means available of removing the paratoluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever and to insure complete dryness of the diol, as described in the final procedure just preceding Table 2.

The products obtained in Part 1, preceding, may contain a basic catalyst. As a general procedure, I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage, needless to say, a second filtration may be required. In any event, the neutral or slightly acidic solution of the oxypropylated derivatives described in Part 1 is then diluted further with sufficient xylene, decalin, petroleum solvent, or the like, so that one has obtained approximately a 45%–65% solution. To this solution there is added a polycarboxylated reactant, as previously described, such as phthalic anhydride, succinic acid, or anhydride, diglycollic acid, etc. The mixture is refluxed until esterification is complete, as indicated by elimination of water or drop in carboxyl value. Needless to say, if one produces a half-ester from an anhydride such as phthalic anhydride, no water is eliminated. However, if it is obtained from diglycollic acid, for example, water is eliminated. All such procedures are conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent or the solvent removed after oxypropylation. Such oxypropylation end-product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the hydrated sodium sulfate and probably the sodium chloride formed. The clear, somewhat viscous, straw-colored amber liquid so obtained may contain a small amount of sodium sulfate or sodium chloride, but in any event is perfectly acceptable for esterification in the manner described.

It is to be pointed out that the products here described are not polyesters in the sense that there is a plurality of both diol radicals and acid radicals; the product is characterized by having only one diol radical.

In some instances and, in fact, in many instances, I have found that in spite of the dehydration methods employed above, a mere trace of water still comes through, and that this mere trace of water certainly interferes with the acetyl or hydroxyl value determination, at least when a number of conventional procedures are used and may retard esterification, particularly where there is no sulfonic acid or hydrochloric acid present as a catalyst. Therefore, I have preferred to use the following procedure: I have employed about 200 grams of the diol compound, as described in Part 1, preceding; I have added about 60 grams of benzene and refluxed this mixture in the glass resin pot, using a phase-separating trap, until the benzene carried out all the water present as water of solution or the equivalent. Ordinarily this refluxing temperature is apt to be in the neighborhood of 130° C. to possibly 150° C. When all this water or moisture has been removed I also withdraw approximately 20 grams, or a little less, benzene and then add the required amount of the carboxy reactant and also about 150 grams of a high-boiling aromatic petroleum solvent. These solvents are sold by various oil refineries and, as far as solvent effect goes, act as if they were almost completely aromatic in character. Typical distillation data in the particular type I have employed and found very satisfactory is the following:

I. B. P., 142° C.  
5 ml., 200° C.  
10 ml., 209° C.  
15 ml., 215° C.  
20 ml., 216° C.  
25 ml., 220° C.  
30 ml., 225° C.  
35 ml., 230° C.  
40 ml., 234° C.  
45 ml., 237° C.  
50 ml., 242° C.  
55 ml., 244° C.  
60 ml., 248° C.  
65 ml., 282° C.  
70 ml., 252° C.  
75 ml., 260° C.  
80 ml., 264° C.  
85 ml., 270° C.  
90 ml., 280° C.  
95 ml., 307° C.

After this material is added refluxing is continued and, of course, is at a high temperature, to wit, about 160° to 170° C. If the carboxy reactant is an anhydride, needless to say, no water of reaction appears; if the carboxy reactant is an acid, water of reaction should appear and should be eliminated at the above reaction temperature. If it is not eliminated, I simply separate out another 10 to 20 cc. of benzene by means of the phase-separating trap and thus raise the temperature to 180° or 190° C., or even to 200° C., if need be. My preference is not to go above 200° C.

The use of such solvent is extremely satisfactory, provided one does not attempt to remove the solvent subsequently, except by vacuum distillation, and provided there is no objection to a little residue. Actually, when these materials are used for a purpose, such as demulsification, the solvent might just as well be allowed to remain. If the solvent is to be removed by distillation, and particularly vacuum distillation, then the high boiling aromatic petroleum solvent might well be replaced by some more expensive solvent, such as decalin or an alkylated decalin which has a rather definite or close range boiling point. The removal of the solvent, of course, is purely a conventional procedure and requires no elaboration.

When starting with the high molal glycol, as herein described, as one of the raw materials I have found that xylene by itself is practically or almost as satisfactory as other solvents or mixtures. Decalin also is suitable. Actually, at times there is some advantage in using a mixture of a high-boiling aromatic petroleum solvent and xylene in preparation of other typical examples of the kind herein described.

The data included in the subsequent tables, i. e., Tables 2 and 3, are self-explanatory and very complete and it is believed no further elaboration is necessary.

TABLE 2

| Ex. No. of acid ester | Ex. No. of hydroxy cmpd. | Theo. mol. wt. of H.C. | Theo. hydroxyl value of H. C. | Actual hydroxyl value | Mol. wt. Based on actual H.V. | Amt. of hyd. cmpd. (grs.) | Polycarboxy reactant | Amt. of polycarboxy reactant (grs.) |
|---|---|---|---|---|---|---|---|---|
| 1b | 4a | 3,090 | 36.3 | 54.7 | 2,050 | 205 | Diglycolic acid | 26.8 |
| 2b | 4a | 3,090 | 36.3 | 54.7 | 2,050 | 205 | Phthalic anhydride | 29.6 |
| 3b | 4a | 3,090 | 36.3 | 54.7 | 2,050 | 205 | Maleic anhydride | 19.6 |
| 4b | 4a | 3,090 | 36.3 | 54.7 | 2,050 | 205 | Aconitic acid | 34.8 |
| 5b | 4a | 3,090 | 36.3 | 54.7 | 2,050 | 205 | Citraconic anhydride | 22.4 |
| 6b | 4a | 3,090 | 36.3 | 54.7 | 2,050 | 205 | Succinic acid | 23.6 |
| 7b | 5a | 4,070 | 27.6 | 49.1 | 2,289 | 229 | Diglycolic acid | 26.8 |
| 8b | 5a | 4,070 | 27.6 | 49.1 | 2,289 | 229 | Maleic anhydride | 19.6 |
| 9b | 5a | 4,070 | 27.6 | 49.1 | 2,289 | 229 | Phthalic anhydride | 29.6 |
| 10b | 5a | 4,070 | 27.6 | 49.1 | 2,289 | 229 | Aconitic acid | 34.8 |
| 11b | 5a | 4,070 | 27.6 | 49.1 | 2,289 | 229 | Citraconic anhydride | 22.8 |
| 12b | 5a | 4,070 | 27.6 | 49.1 | 2,289 | 229 | Succinic acid | 23.6 |
| 13b | 10a | 2,920 | 38.3 | 59.6 | 1,885 | 188.5 | Diglycolic acid | 26.8 |
| 14b | 10a | 2,920 | 38.3 | 59.6 | 1,885 | 188.5 | Phthalic anhydride | 29.6 |
| 15b | 10a | 2,920 | 38.3 | 59.6 | 1,885 | 188.5 | Maleic anhydride | 19.6 |
| 16b | 10a | 2,920 | 38.3 | 59.6 | 1,885 | 188.5 | Citraconic anhydride | 22.4 |
| 17b | 10a | 2,920 | 38.3 | 59.6 | 1,885 | 188.5 | Aconitic acid | 34.8 |
| 18b | 10a | 2,920 | 38.3 | 59.6 | 1,885 | 188.5 | Succinic acid | 23.6 |
| 19b | 11a | 4,630 | 24.2 | 47.6 | 2,358 | 235.8 | Diglycolic acid | 26.8 |
| 20b | 11a | 4,630 | 24.2 | 47.6 | 2,358 | 235.8 | Phthalic anhydride | 29.6 |
| 21b | 11a | 4,630 | 24.2 | 47.6 | 2,358 | 235.8 | Maleic anhydride | 19.6 |
| 22b | 11a | 4,630 | 24.2 | 47.6 | 2,358 | 235.8 | Citraconic anhydride | 22.4 |
| 23b | 11a | 4,630 | 24.2 | 47.6 | 2,358 | 235.8 | Aconitic acid | 34.8 |
| 24b | 11a | 4,630 | 24.2 | 47.6 | 2,358 | 235.8 | Succinic acid | 23.6 |
| 25b | 16a | 3,210 | 34.9 | 56.7 | 1,975 | 197.5 | Diglycolic acid | 26.8 |
| 26b | 16a | 3,210 | 34.9 | 56.7 | 1,975 | 197.5 | Maleic anhydride | 19.6 |
| 27b | 16a | 3,210 | 34.9 | 56.7 | 1,975 | 197.5 | Phthalic anhydride | 29.6 |
| 28b | 16a | 3,210 | 34.9 | 56.7 | 1,975 | 197.5 | Citraconic anhydride | 22.4 |
| 29b | 16a | 3,210 | 34.9 | 56.7 | 1,975 | 197.5 | Aconitic acid | 34.8 |
| 30b | 16a | 3,210 | 34.9 | 56.7 | 1,975 | 197.5 | Succinic acid | 23.6 |
| 31b | 20a | 3,270 | 34.35 | 54.6 | 2,035 | 203.5 | Diglycolic acid | 26.8 |
| 32b | 20a | 3,270 | 34.35 | 54.6 | 2,035 | 203.5 | Maleic acid | 29.6 |
| 33b | 20a | 3,270 | 34.35 | 54.6 | 2,035 | 203.5 | Phthalic anhydride | 19.6 |
| 34b | 20a | 3,270 | 34.35 | 54.6 | 2,035 | 203.5 | Citraconic anhydride | 22.4 |
| 35b | 20a | 3,270 | 34.35 | 54.6 | 2,035 | 203.5 | Aconitic acid | 34.8 |
| 36b | 20a | 3,270 | 34.35 | 54.6 | 2,035 | 203.5 | Succinic acid | 23.6 |

TABLE 3

| Ex. No. of acid ester | Solvent | Amt. solvent (grs.) | Maximum esterification temp., °C. | Time of esterification (hrs.) | Water out (cc.) |
|---|---|---|---|---|---|
| 1b | Xylene | 228 | 140 | 7 | 3.6 |
| 2b | do | 235 | 150 | 7 | |
| 3b | do | 225 | 142 | 3 | |
| 4b | do | 236 | 145 | 5 | 3.6 |
| 5b | do | 227 | 150 | 5 | |
| 6b | do | 225 | 150 | 5 | 3.6 |
| 7b | do | 252 | 141 | 6 | 3.6 |
| 8b | do | 249 | 135 | 2 | |
| 9b | do | 259 | 150 | 6 | |
| 10b | do | 260 | 147 | 6 | 3.6 |
| 11b | do | 252 | 150 | 6 | |
| 12b | do | 249 | 150 | 6 | 3.6 |
| 13b | do | 212 | 145 | 6 | 3.6 |
| 14b | do | 218 | 150 | 7 | |
| 15b | do | 209 | 140 | 2½ | |
| 16b | do | 211 | 150 | 6 | |
| 17b | do | 220 | 150 | 6 | 3.6 |
| 18b | do | 208 | 150 | 6 | 3.6 |
| 19b | do | 259 | 150 | 8 | 3.6 |
| 20b | do | 265 | 150 | 6 | |
| 21b | do | 255 | 143 | 3 | |
| 22b | do | 258 | 150 | 7 | |
| 23b | do | 267 | 150 | 7 | 3.6 |
| 24b | do | 256 | 150 | 6 | 3.6 |
| 25b | do | 220 | 150 | 6 | 3.6 |
| 26b | do | 216 | 140 | 2½ | |
| 27b | do | 227 | 148 | 8 | |
| 28b | do | 220 | 145 | 6 | |
| 29b | do | 229 | 150 | 7 | 3.6 |
| 30b | do | 198 | 150 | 7 | 3.6 |
| 31b | do | 207 | 150 | 6 | 3.6 |
| 32b | do | 233 | 150 | 6 | |
| 33b | do | 223 | 140 | 3 | |
| 34b | do | 226 | 150 | 4 | |
| 35b | do | 235 | 150 | 6 | 3.6 |
| 36b | do | 223 | 150 | 6 | 3.6 |

The procedure for manufacturing the esters has been illustrated by preceding examples. If for any reason reaction does not take place in a manner that is acceptable, attention should be directed to the following details:

(a) Recheck the hydroxyl or acetyl value of the oxypropylated high molal glycol as in Part 1, preceding;

(b) If the reaction does not proceed with reasonable speed, either raise the temperature indicated or else extend the period of time up to 12 or 16 hours if need be;

(c) If necessary, use ½% of paratoluene sulfonic acid, or some other acid, as a catalyst; and (d) If the esterification does not produce a clear product, a check should be made to see if an inorganic salt such a sodium chloride or sodium sulfate is not precipitating out. Such salt should be eliminated, at least for exploration experimentation, and can be removed by filtering.

Everything else being equal, as the size of the molecule increases and the reactive hydroxyl radical represents a smaller fraction of the entire molecule, more difficulty is involved in obtaining complete esterification.

Even under the most carefully controlled conditions of oxypropylation involving comparatively low temperatures and long time of reaction, there are formed certain compounds whose compositions are still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances an attempt to react the stoichiometric amount of a polycarboxy acid with the oxypropylated derivative results in an excess of the carboxylated reactant, for the reason that apparently under conditions of reaction less reactive hydroxyl radicals are present than indicated by the hydroxyl value. Under such circumstances there is simply a residue of the carboxylic reactant which can be removed by filtration, or, if desired, the esterification procedure can be repeated, using an appropriately reduced ratio of carboxylic reactant.

Even the determination of the hydroxyl value and conventional procedure leaves much to be desired, due either to the cogeneric materials previously referred to, or, for that matter, the presence of any inorganic salts or propylene oxide. Obviously this oxide should be eliminated.

The solvent employed, if any, can be removed from the finished ester by distillation, and particularly vacuum distillation. The final products or liquids are generally from almost black or reddish-black to dark amber in color, and show moderate viscosity. They can be bleached with bleaching clays, filtering chars, and the like. However, for the purpose of demulsification or the like, color is not a factor and decolorization is not justified.

In the above instances I have permitted the solvents to remain present in the final reaction mass. In other instances I have followed the same procedure, using decalin or a mixture of decalin or benzene in the same manner and ultimately removed all the solvents by vacuum distillation.

PART 3

In the hereto appended claims the demulsifying agent is described as an ester obtained from a polyhydroxylated material prepared from the described diols. If one were concerned with a monohydroxylated material or a dihydroxylated material one might be able to write a formula which in essence would represent the particular product. However, in a more highly hydroxylated material the problem becomes increasingly more difficult for reasons which have already been indicated in connection with oxypropylation and which can be examined by merely considering for the moment a monohydroxylated material.

Oxyalkylation, particularly in any procedure which involves the introduction of repetitious ether linkages, i. e., excessive oxyalkylation, using, for example, ethylene oxide, propylene oxide, etc., runs into difficulties of at least two kinds; (a) formation of a cogeneric mixture rather than a single compound, and (b) excessive side reactions or the like. The former phase will be considered in the paragraphs following. As to the latter phase, see U. S. Patent No. 2,236,919 dated April 1, 1941, to Reynhart.

Oxypropylation involves the same sort of variations as appear in preparing high molal polypropylene glycols. Propylene glycol has a secondary alcoholic radical and a primary alcohol radical. Obviously then polypropylene glycols could be obtained, at least theoretically, in which two secondary alcoholic groups are united or a secondary alcohol group is united to a primary alcohol group, etherization being involved, of course, in each instance. Needless to say, the same situation applies when one has oxypropylated polyhydric materials having 4 or more hydroxyls, or the obvious equivalent.

Usually no effort is made to differentiate between oxypropylation taking place, for example, at the primary alcohol radical or the secondary alcohol radical. Actually, when such products are obtained, such as a high molal propylene glycol or the products obtained in the manner herein described one does not obtain a single derivative such as HO(RO)$_n$H or —(RO)$_n$H in which $n$ has one and only one value, for instance, 14, 15 or 16, or the like. Rather, one obtains a cogeneric mixture of closely related or touching homologues. These materials invariablyl have high molecular weights, and cannot be separated from one another by any known procedure, without decomposition. The proportion of such mixture represents the contribution of the various individual members of the mixture. On a statistical basis, of course, $n$ can be appropriately specified. For practical purposes one need only consider the oxypropylation of a monohydric alcohol because in essence this is substantially the mechanism involved. Even in such instances where one is concerned with a monohydric reactant one cannot draw a single formula and say that by following such procedure one can readily obtain 80% or 90% or 100% of such compound. However, in the case of at least monohydric initial reactants one can readily draw the formulas of a large number of compounds which appear in some of the probable mixtures or can be prepared as components and mixtures which are manufactured conventionally.

Simply by way of illustration reference is made to U. S. Patent No. 2,549,434, dated April 17, 1951, to De Groote, Wirtel and Pettingill.

However, momentarily referring again to a monohydric initial reactant it is obvious that if one selects any such simple hydroxylated compound and subjects such compound to oxyalkylation, such as oxyethylation, or oxypropylation, it becomes apparent that one is really producing a polymer of the alkylene oxide except for the terminal group. This is particularly true where the amount of oxide added is comparatively large, for instance, 10, 20, 30, 40 or 50 units. If such compound is subjected to oxyethylation so as to introduce 30 units of ethylene oxide, it is well known that one does not obtain a single constituent which, for the sake of convenience, may be indicated as $RO(C_2H_4O)_{30}OH$. Instead, one obtains a cogeneric mixture of closely related homologues in which the formula may be shown as the following: $RO(C_2H_4O)_nH$, wherein $n$, as far as the statistical average goes, is 30, but the individual members present in significant amount may vary from instances where $n$ has a value of 25, and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental Principles of Condensation Polymerization," by Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description, or else consider the value of $n$, in formulas such as those which have appeared previously and which appear in the claims, as representing both individual constituents in which $n$ has a single definite value, and also with the understanding that $n$ represents the average statistical value based on the assumption of completeness of reaction.

This may be illustrated as follows: Assume that in any particular example the molal ratio of propylene oxide per hydroxyl is 15 to 1. In a generic formula 15 to 1 could be 10, 20, or some other amount and indicated by $n$. Referring to this specific case actually one obtains products in which $n$ probably varies from 10 to 20, perhaps even further. The average value, however, is 15, assuming, as previously stated, that the reaction is complete. The product shown by the formula is perhaps best described also in terms of method of manufacture.

It becomes obvious that when carboxylic acidic esters are prepared from such high molal molecular weight materials that the ultimate esterification product must, in turn, be a cogeneric mixture. Likewise, it is obvious that the contribution to the total molecular weight made by the polycarboxy reactant is small. Thus, one might expect that the effectiveness of the demulsifier in the form of the acidic fractional ester would be comparable to the esterified hydroxylated material. Remarkably enough, in practically every instance the product is distinctly better, and in the majority of instances much more effective.

PART 4

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrochloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of my process.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and reintroduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation.

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 7b with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier. A mixture which illustrates such combination is the following:

Oxyalkylated derivative, for example, the product of Example 7b, 20%;
A cyclohexylamine salt of a polypropylated naphthalene monosulfonic acid, 24%;
An ammonium salt of a polypropylated naphthalene monosulfonic acid, 24%;
A sodium salt of oil-soluble mahogany petroleum sulfonic acid, 12%;
A high-boiling aromatic petroleum solvent, 15%;
Isopropyl alcohol, 5%.

The above proportions are all weight percents.

Having thus described my invention what I claim as new and desire to secure by Letters Patent, is:

1. A process for breaking petroleum emulsions of the water-in-oil type characterized by subjecting the emulsion to the action of a demulsifier including synthetic hydrophile products; said synthetic hydrophile products being characterized by the following formula:

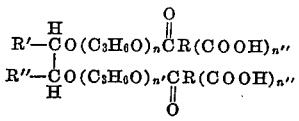

in which R' represents a saturated alkyl radical containing at least 5 and not more than 18 carbon atoms, and R" represents a saturated alkyl radical containing not more than 18 carbon atoms; $n$ and $n'$ represent whole numbers which, when added together, equal a sum varying from 15 to 80; $n''$ is a whole number not over 2, and R is the carbon-linked radical of a polycarboxy acid selected from the group consisting of acyclic and isocyclic polycarboxy acids.

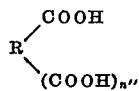

in which $n''$ has its previous significance; with the final proviso that the parent dihydroxylated compound prior to esterification be water-insoluble.

2. A process for breaking petroleum emulsions of the water-in-oil type characterized by subjecting the emulsion to the action of a demulsifier including synthetic hydrophile products; said synthetic hydrophile products being characterized by the following formula:

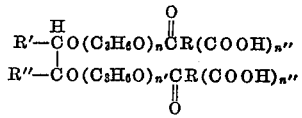

in which R' and R" represent saturated unsubstituted alkyl groups having straight chains containing from 7 to 18 carbon atoms; $n$ and $n'$ represent whole numbers which, when added together, equal a sum varying from 15 to 80; $n''$ is a whole number not over 2, and R is the carbon-linked radical of a polycarboxy acid selected from the group consisting of acyclic and isocyclic polycarboxy acids

in which $n''$ has its previous significance; with the final proviso that the parent dihydroxylated compound prior to esterification be water-insoluble.

3. A process for breaking petroleum emulsions of the water-in-oil type characterized by subjecting the emulsion to the action of a demulsifier including synthetic hydrophile products; said synthetic hydrophile products being characterized by the following formula:

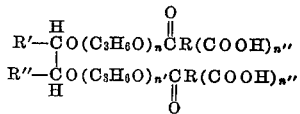

in which R' and R" represent the same saturated unsubstituted alkyl groups having straight chains containing from 7 to 18 carbon atoms; $n$ and $n'$ represent whole numbers which, when added together, equal a sum varying from 15 to 80; $n''$ is a whole number not over 2, and R is the carbon-linked radical of a polycarboxy acid selected from the group consisting of acyclic and isocyclic polycarboxy acids

in which $n''$ has its previous significance; with the final proviso that the parent dihydroxylated compound prior to esterification be water-insoluble.

4. A process for breaking petroleum emulsions of the water-in-oil type characterized by subjecting the emulsion to the action of a demulsifier including synthetic hydrophile products; said synthetic hydrophile products being characterized by the following formula:

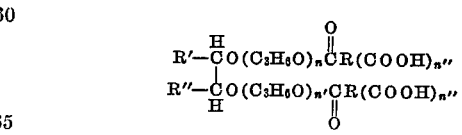

in which R' and R" represent the same saturated unsubstituted alkyl groups having straight chains containing from 7 to 18 carbon atoms; $n$ and $n'$ represent whole numbers which, when added together, equal a sum varying from 15 to 80; $n''$ is a whole number not over 2, and R is the carbon-linked radical of a polycarboxy acid selected from the group consisting of acyclic and isocyclic polycarboxy acids

in which $n''$ has its previous significance; with the final proviso that the parent dihydroxylated compound prior to esterification be water-insoluble and xylene-soluble.

5. A process for breaking petroleum emulsions of the water-in-oil type characterized by subjecting the emulsion to the action of a demulsifier including synthetic hydrophile products; said synthetic hydrophile products being characterized by the following formula:

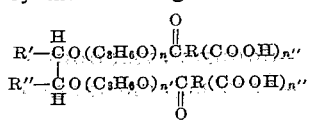

in which R′ and R″ represent the same saturated unsubstituted alkyl groups having straight chains containing from 7 to 18 carbon atoms; $n$ and $n'$ represent whole numbers which, when added together, equal a sum varying from 15 to 80; $n''$ is a whole number not over 2, and R is the carbon-linked radical of a polycarboxy acid selected from the group consisting of acyclic and isocyclic polycarboxy acids:

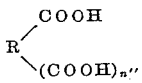

in which $n''$ has its previous significance; said polycarboxy acid having not over 8 carbon atoms; with the final proviso that the parent dihydroxylated compound prior to esterification be water-insoluble and xylene-soluble.

6. A process for breaking petroleum emulsions of the water-in-oil type characterized by subjecting the emulsion to the action of demulsifier including synthetic hydrophile products; said synthetic hydrophile products being characterized by the following formula:

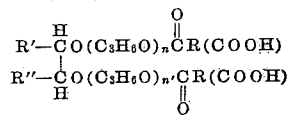

in which R′ and R″ represent the same saturated unsubstituted alkyl groups having straight chains containing from 7 to 18 carbon atoms; $n$ and $n'$ represent whole numbers which, when added together, equal a sum varying from 15 to 80; and R is the carbon-linked radical of a dicarboxy acid selected from the group consisting of acyclic and isocyclic dicarboxy acids

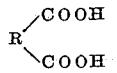

said dicarboxy acid having not over 8 carbon atoms; and with the further proviso that the parent dihydroxylated compound prior to esterification be water-insoluble and xylene-soluble.

7. The process of claim 6 wherein the dicarboxy acid is phthalic acid.
8. The process of claim 6 wherein the dicarboxy acid is maleic acid.
9. The process of claim 6 wherein the dicarboxy acid is succinic acid.
10. The process of claim 6 wherein the dicarboxy acid is citraconic acid.
11. The process of claim 6 wherein the dicarboxy acid is diglycollic acid.

References Cited in the file of this patent

UNITED STATES PATENTS

| Number | Name | Date |
| --- | --- | --- |
| 2,562,878 | Blair | Aug. 7, 1951 |
| 2,597,204 | Todd et al. | May 20, 1952 |